United States Patent [19]

Reuter

[11] Patent Number: 4,644,266
[45] Date of Patent: Feb. 17, 1987

[54] METHOD AND APPARATUS FOR RECOGNIZING MALFUNCTION IN A HEATER OPERATED WITH LIQUID FUEL

[75] Inventor: Fritz Reuter, Esslingen, Fed. Rep. of Germany

[73] Assignee: J. Eberspachge, Fed. Rep. of Germany

[21] Appl. No.: 747,668

[22] Filed: Jun. 21, 1985

[30] Foreign Application Priority Data

Jun. 26, 1985 [DE] Fed. Rep. of Germany ....... 3423466

[51] Int. Cl.$^4$ .......................... G01R 31/28; F23N 5/24
[52] U.S. Cl. ...................................... 324/73 R; 431/13
[58] Field of Search ..................... 324/73 R; 165/11.1, 165/11.2, 11 A; 431/13, 14, 15, 16, 17, 24, 25, 26; 237/28, 32

[56] References Cited

U.S. PATENT DOCUMENTS

| | | | |
|---|---|---|---|
| 3,781,161 | 12/1973 | Schuss | 431/16 |
| 3,970,929 | 7/1976 | Borucki et al. | 324/73 R |
| 4,139,818 | 2/1979 | Schneider | 324/73 R |

Primary Examiner—Ernest F. Karlsen
Attorney, Agent, or Firm—McGlew and Tuttle

[57] ABSTRACT

An apparatus and method for recognizing malfunctions of a heater operated with liquid fuel uses output signals of a function testing circuit to be displayed in coded form. By this method it is possible to identify, on a display, which is preferably an operating state indicator light, a disturbance. The type of disturbance and hence the trouble spot can also be displayed without any further expenditure.

4 Claims, 4 Drawing Figures

METHOD AND APPARATUS FOR RECOGNIZING MALFUNCTION IN A HEATER OPERATED WITH LIQUID FUEL

FIELD AND BACKGROUND OF THE INVENTION

The invention relates to a method and apparatus for recognizing malfunctions of a vehicular heater operated with liquid fuel, the heater having assigned to it a control unit for control of the operating cycles, as well as a display for indication of the operating state of the heater. The display is supplied with the output signal of a function testing circuit with which all functions essential to the operation are polled successively and determined by a comparison between desired and actual values of electrical voltages associated with the functions by means of a polling control.

The term "heater" is meant to include not only the heating equipment provided for heating the interior of a vehicle, but also e.g. cooking stoves in trailers or campers. The fuel used may be liquid propane, heating gas, or other fuel. The vehicles also include boats or building site equipment such as Caterpillar (a trademark) vehicles or cranes, in which engine-independent heaters are installed.

Engine independent heaters for vehicles are known whose current supply is through a battery belonging to the vehicle. These heaters have a control unit for control of their operational cycle. A display means associated with the heater indicates, by lighting up, the switch setting of the heater as soon as the latter is turned on. The function of the control unit is to control the timing according to a given pattern. In particular the blower motor, the fuel feed and the ignition are controlled so that safe operation is possible. At the same time the heater components are monitored as to their functioning and timing. In case of irregularities and malfunctions, the heater is stopped permanently. The cause for stopping the heater remains stored in the control unit until the heater is disconnected.

In known heaters, testing the functions of the individual components is possible only by testing each component individually, including the control unit. Much effort is necessary for this and at least involves locating a customer service shop.

Checking by the user himself is not possible with known heaters. This makes it impossible for the user to fix minor defects himself, and also the shop must first make a relatively expensive diagnosis to identify the trouble spot.

Further a diagnostic system is known which permits defect representation by means of the tachometer and a control bulb. The diagnosis is initiated through the establishment of a state on sensors which normally does not occur during travel. If, with the ignition on, the full load and no load switches are actuated simultaneously, the diagnostic process begins. Occurring defects are shown on the display one after the other, operation of the brake light switch causing it to advance from one defect display to the next. The mechanic reads the correlation between the defects and the tachometer indication from a table. When all defects have been represented, the indication starts over again with the first. After the ignition is turned off, the diagnostic process ends.

SUMMARY OF THE INVENTION

It is the object of the present invention to provide for heaters of the species whereby it is possible, without additional effort, in particular without disassembly of the heater, to identify an occurring defect without any special professional knowledge. For this method, time tested and reliable components are to be used.

This problem is solved by a method in which each individual output signal of the function testing circuit is supplied first to a coder with following read only memory for the output code, then to a shift register with a transfer clock for the output code into the shift register and with an output clock for the shift register, and then via a power stage acting as amplifier to the display, in coded form.

Indication is by output of the state signals present in the control unit or respectively of the state signals of the breakdown member, so that the electrical defect recognition can take place as a signal at a bulb to be additionally connected e.g. on the dashboard of the vehicle. Instead of the additional bulb there can be used the turn on control bulb present on the heater. Instead of the applied blinker rhythm, an acoustical indication may occur. In any case, the signal is indicated in the manner preset by the connected coder, so that the user can recognize the defect by the indicator rhythm.

Accordingly an object of the present invention is to provide an apparatus for recognizing each of a plurality of possible malfunctions in a heater operated with heating fuel, comprising sensor means for comparing a desired electrical value with an actual value for each type of malfunction, polling means connected to said sensor means for successively determining the results of the comparison for each type of malfunction to produce a signal indicative of whether each type of malfunction has occurred or not, coder means connected to said polling means for forming an input code corresponding to each signal from said polling means, a read-only memory connected to said coder means for forming an output code for each input code of said coder means, a shift register connected to said read-only memory and having a transfer clock having pulses for reading out successive output codes from said read-only memory to said shift register, a power stage connected to said shift register for amplifying signals corresponding to said output codes from said shift register and display means connected to said power stage for producing a perceivable display corresponding to each amplified output code.

A further object of the present invention is to provide a method of operating such a heater which utilizes the inventive apparatus to produce perceivable displays corresponding to each of the possible malfunctions.

Another object of the invention is to provide an apparatus for recognizing each of a plurality of possible malfunctions in a heater which is operated using heating fuel, and particularly liquid fuel, which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
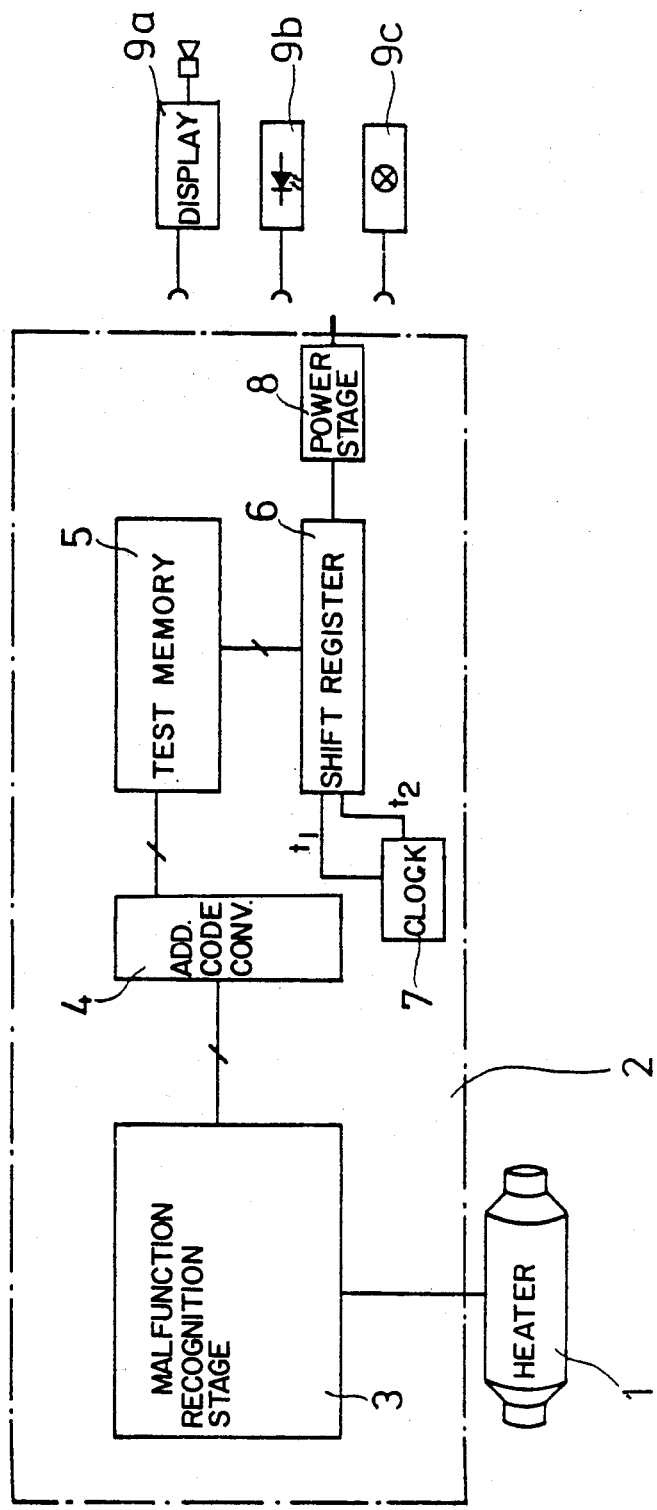
FIG. 1 is a circuit diagram for the heater with control and code output according to the invention.
Figure 2:
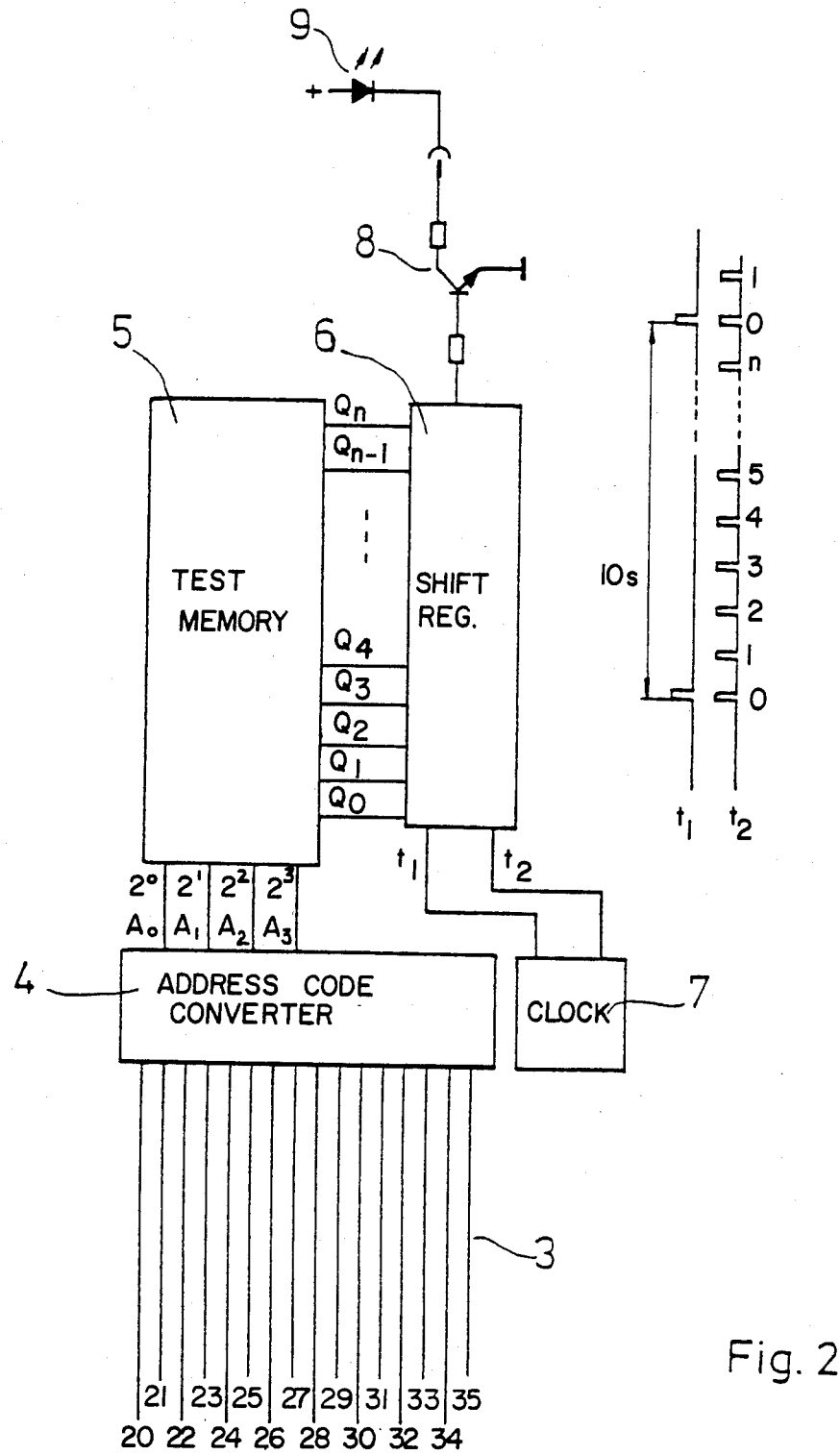
FIG. 2 is a circuit diagram for the code output of the circuit in FIG. 1.
Figure 3:
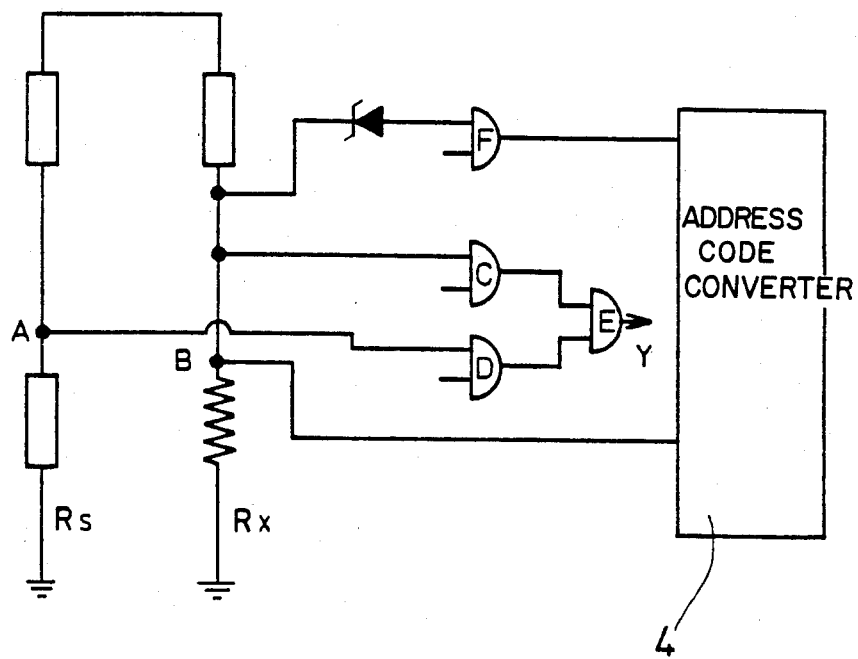
FIG. 3 is a circuit diagram for a comparator circuit which is used in the invention.
Figure 4:
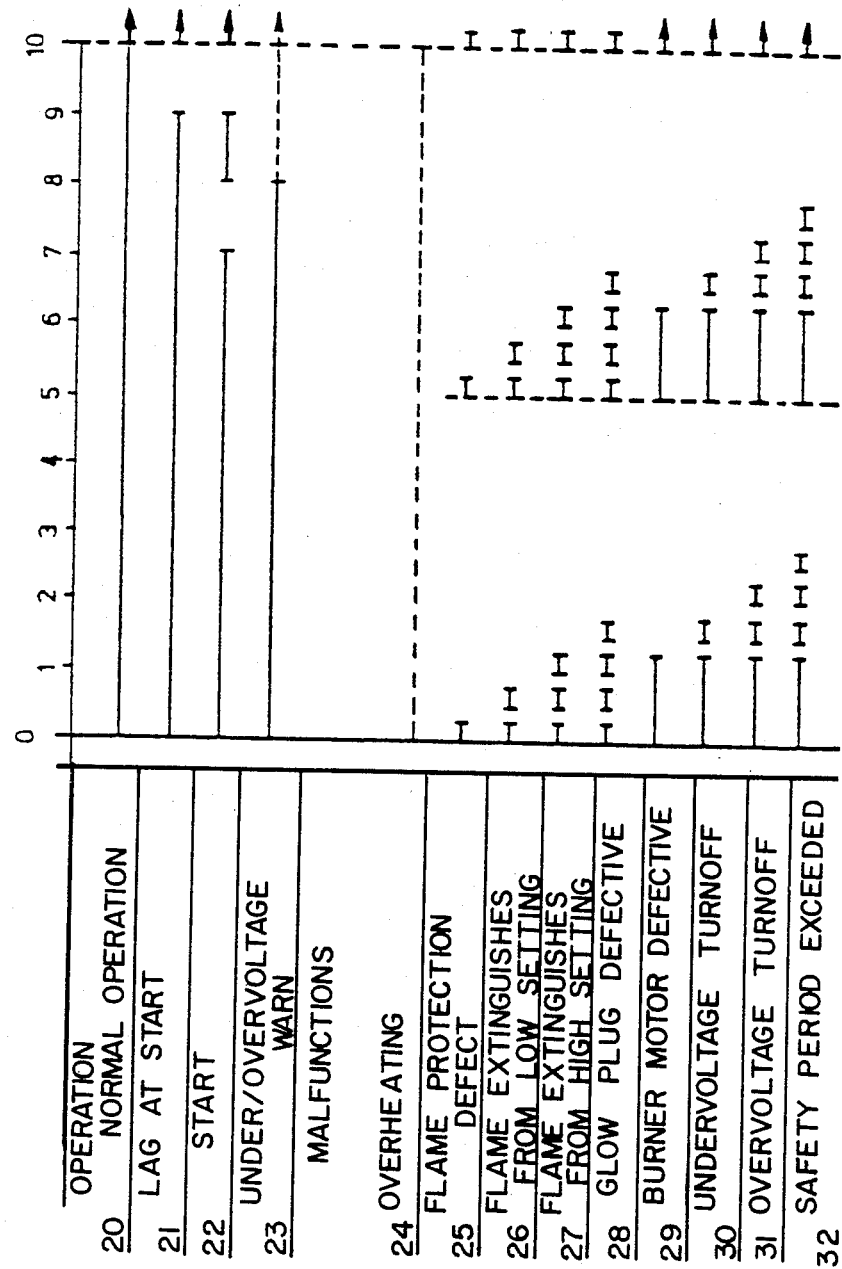
FIG. 4 is a graphic example of an output code which can be used as blinking code or as signal code.

In FIG. 1 in the inventive circuit diagram for heaters with control and code output is illustrated schematically and in simplified form. A heater 1 is equipped with a heater control unit 2. Such control units are known. According to the invention, the arrangement for function display is integrated in this control unit 2. It consists of the polling control and malfunction recognition stage 3 for the heater 1, the then following address code converter 4, to which are supplied the state signals from the polling control and malfunction recognition stage 3. This is followed by a ROM for the output code, in the form of a test memory 5.0. Output codes are supplied to a shift register 6 from ROM 5. The shift register includes an output clock 7 with a transfer clock pulse $t_1$ and the shift register pulse $t_2$. The shift register 6 is followed by a power stage 8 from which the signals are supplied to a display 9a, 9b or 9c, arranged outside the control unit 2. The indication may take place selectively e.g. by a buzzer 9a, a diode 9b, or a bulb 9c. FIG. 4 shows an example for an output code, with an indication interval of 10 seconds. As is illustrated in the diagram e.g. the operational function test leads to a continuous signal, while the malfunction signals are perceived as blinking signals. By the intervals of the indication the user can recognize what malfunction is involved and can decide whether he can fix it himself. In the circuit shown in FIG. 2, the positions (items) 20 to 35 indicate the monitored functions, which are stored in the control unit as state signals. Positions 20 to 23 in FIG. 4 are reserved for the normal operational state and positions 24 to 32 for individual cases of malfunction, while the positions 33 to 35 are still available as reserve positions. The polling occurs for example with a circuit as in FIG. 3. FIG. 3 shows a circuit permitting a three-digit information. By this circuit the desired resistance Rs (point A) is compared with the actual resistance Rx (point B) of the unit to be tested. If the two potentials are the same, the two AND gates C and D react in the same manner, each supplying to AND gate E a signal which results in the output of a potential y and forwarding the message "System in order" to the following microprocessor or coder 4 and thence to the test memory 5. This completes the polling step and the next element can be tested. If potential B is too low relative to potential A, gate C will not respond and there will be no message "System in order" to gate E. This would be the case for instance with a shortcircuit of the element to be tested. If, however, potential B is too high relative to potential A, a signal is supplied to gate F via a Zener diode. This, then results is a message that the element to be tested or its connecting line has an interruption.

Coder 4 acts as an address code converter. It converts the state signals of the polling control to a binary code. These are then forwarded to the test value memory 5, i.e. the ROM for the output code. The then following shift register 6 moves the signals on. The output clock 7 transfers the signals $t_1$ from the output code 5 to the shift register 6 and "shifts" the signals through the register. The output clock for the shift register 6 relays the signals after the polling in the form indicated at $t_2$. In the embodiment, the amplifier 8 acting as power stage is arranged before the display 9a, 9b or 9c.

While a specific embodiment of the invention has been shown and described in detail to illustrate the application of the principles of the invention, it will be understood that the invention may be embodied otherwise without departing from such principles.

What is claimed is:

1. A method for recognizing each of a plurality of possible malfunctions in a heater operated with heating fuel using a control unit connected to the heater for controlling the operating cycles of the heater, a display for indicating the operating state of the heater, sensing means for comparing a desired electrical voltage to an actual electrical voltage for each type of malfunction, and polling means for sequentially and successively determining the results of the comparison for each type of function to produce signals indicative of the occurrence or non-occurrence of each type of malfunction, comprising supplying the signals to a coder which produces a different input code for each signal, supplying each input code to a read-only memory which converts each input code to a selected output code, supplying each output code to a shift register, operating the shift register using transfer clock pulses to read through each output code of the read-only memory corresponding to each input code of the coder, the shift register producing successive shift register outputs for each output code of the read-only memory, amplifying each successive shift register output and applying each amplified shift register output to the display for producing a perceivable display corresponding to each signal of the polling means whereby an observer may learn which of the possible malfunctions has occurred.

2. A method according to claim 1, wherein the shift register outputs each comprise periodically repeating sequences of short and long display indications on said display.

3. An apparatus for recognizing each of a plurality of possible malfunctions in a heating fuel operated heater comprising:

sensor means for comparing a desired electrical voltage value with an actual electrical voltage value for each type of malfunction;

polling means connected to said sensor means for successively determining the results of the comparison for each type of malfunction to produce a signal indicating the occurrence and non-occurrence of each type of malfunction;

coder means connected to said polling means for forming an input code corresponding to each signal from said polling means;

a read-only memory connected to said coder means for forming an output code for each input code;

a shift register having a transfer clock for generating timing pulses, said shift register connected to said read-only memory and reading said output codes of said read-only memory sequentially using pulses of said transfer clock to switch from one output code to the next, said shift register forming a shift register output corresponding to the reading of each output code;

a power stage connected to said shift register for amplifying each shift register output; and a display connected to said power stage for forming a perceivable display for each amplified shift register output corresponding to the presence and absence of each type of malfunction.

4. An apparatus according to claim 3, including control means connected to said heater for controlling operating cycles of said heater, said control means including an operating state indicator indicating whether said heater is operating or not, said operating state display comprising said display means, said shift register structure to activate said operating state display in a sequence of short and long indications each representing a separate type of malfunction.

* * * * *